(12) United States Patent
Yoshida et al.

(10) Patent No.: US 7,014,245 B2
(45) Date of Patent: Mar. 21, 2006

(54) CONVERTIBLE VEHICLE

(75) Inventors: Koji Yoshida, Yokosuka (JP); Junichi Touura, Yokosuka (JP)

(73) Assignee: Kanto Auto Works, Ltd., Kanagawa (JP)

( * ) Notice: Subject to any disclaimer, the term of this patent is extended or adjusted under 35 U.S.C. 154(b) by 0 days.

(21) Appl. No.: 10/989,884

(22) Filed: Nov. 15, 2004

(65) Prior Publication Data

US 2005/0104411 A1    May 19, 2005

(30) Foreign Application Priority Data

Nov. 17, 2003  (JP) .............................. 2003-387049

(51) Int. Cl.
*B60J 10/10* (2006.01)
(52) U.S. Cl. ..................... 296/107.01; 296/107.08; 296/107.17; 296/108
(58) Field of Classification Search ........... 296/107.01, 296/107.08, 107.17, 108
See application file for complete search history.

(56) References Cited

U.S. PATENT DOCUMENTS

| | | | |
|---|---|---|---|
| 3,271,067 A | 9/1966 | Rollman | |
| 5,769,483 A | 6/1998 | Danzl et al. | |
| 6,425,622 B1 | 7/2002 | Eberle | |
| 6,502,892 B1 | 1/2003 | Eberle | |
| 6,604,775 B1 * | 8/2003 | Obendiek | 296/108 |
| 6,666,495 B1 * | 12/2003 | Nania | 296/107.08 |
| 6,695,386 B1 * | 2/2004 | Willard | 296/107.17 |
| 2001/0020793 A1 | 9/2001 | Eberle | |
| 2002/0084678 A1 | 7/2002 | Schutt et al. | |
| 2002/0158485 A1 | 10/2002 | Obendiek | |
| 2003/0080580 A1 | 5/2003 | Obendiek | |
| 2003/0085587 A1 * | 5/2003 | Reinsch | 296/107.17 |
| 2003/0201658 A1 | 10/2003 | Obendiek et al. | |
| 2004/0145212 A1 * | 7/2004 | Mac Farland | 296/108 |
| 2004/0195859 A1 * | 10/2004 | Bruder | 296/108 |
| 2004/0222658 A1 * | 11/2004 | Dilluvio | 296/107.08 |

FOREIGN PATENT DOCUMENTS

| | | |
|---|---|---|
| JP | 62-120218 | 6/1987 |
| JP | 8-175187 | 7/1996 |

* cited by examiner

*Primary Examiner*—Lori L. Coletta
(74) *Attorney, Agent, or Firm*—Jordan and Hamburg LLP (57) ABSTRACT

A convertible vehicle having a long roof is provided which includes first through third roofs, supported by the vehicle body, movable between a use position at which the roofs cover the upper part of a vehicle interior R and a non-use position at which the roofs are held in a housing unit to the rear of a body so that the upper part of the vehicle interior R is open. A rear door is supported by the body so as to rotatably open and close between a closed position and an open position further to the rear of the closed position, wherein when the first through third roofs are in non-use position, the roofs are accommodated in the housing unit, piled up one top of the other in the vertical direction.

8 Claims, 12 Drawing Sheets

CONVERTIBLE VEHICLE

BACKGROUND OF THE INVENTION

The present invention relates to a convertible vehicle comprising a roof that can open and close.

A convertible vehicle comprising a roof made of hard material which is movable between a use position at which such roof covers the upper part of the vehicle interior and a non-use position at which such roof is accommodated in a housing unit at the rear section of a vehicle body so that the upper portion of the vehicle body is open is well known. See Laid-open Japanese Patent Applications S62-120218 and H8-175187.

Conventionally, however, an automobile with a long roof in the lengthwise direction of the body, such as a station wagon, could not be constituted so as to be a convertible vehicle as described above. Because of limitations with respect to the length in the vehicle lengthwise direction of a housing unit for accommodating a roof when in the non-use position, it was not possible to constitute a vehicle body so that a long roof could be accommodated within a housing unit. Therefore, conventionally, only a vehicle with a short roof could constitute a convertible vehicle, and a variety of demands from the market could not be met.

SUMMARY OF THE INVENTION

The object of the present invention is to provide a convertible vehicle not having the above conventional disadvantages.

To achieve the above object, the present invention provides a convertible vehicle having a first through third roofs made of a hard material and supported by the vehicle body so as to be movable between a use position at which the upper part of the vehicle interior is covered and a non-use position at which the roofs are accommodated in a housing unit in the rear section of the vehicle body so as to allow the upper portion of the vehicle interior to be open. A rear door made of a hard material is supported by the body so as to rotatably open and close between a closed position and an open position to the rear of the closed position. When the first through third roofs are in the use position, they are respectively positioned so that the first roof covers the vehicle interior front section, the second roof covers the vehicle interior middle section, which is to the rear of the vehicle interior front section, and the third roof covers the vehicle interior rear section, which is to the rear of the vehicle interior middle section. When the first through third roofs are in their non-use positions, they are accommodated in the housing unit one on top of the other in the vertical direction, so that the third roof is positioned on the bottom, the second roof is positioned thereupon, and the first roof is positioned upon the second roof. The rear door is constituted so that, when the rear door is in the closed position, the rear door covers the vehicle interior rear-end section which is below the third roof when the roof is in the use position. The lower part of the rear door is rotatably connected to the vehicle body so that, when the first through third roofs move between the use position and the non-use position, the rear door is at an open position at which it does not obstruct the movement of the first through third roofs.

It is advantageous that the upper portion of the rear door comprises a cutaway aligned with the middle of the vehicle body in widthwise direction, so that when the first through third roofs are in the use position and the rear door is in the closed position, the third roof is positioned at the cutaway part of the rear door, and when the first through third roofs are in the non-use position and the rear door is in the closed position, the first roof is positioned at the cutaway part of the rear door, the second and third roofs are covered by the first roof, and the upper surface of the first roof is exposed to the outside.

Further, it is advantageous that the third roof when in the non-use position be accommodated in an orientation inverted from its use position orientation in the space between a pair of wheel wells.

It is advantageous that the convertible vehicle include a first link having first and second end portions rotatably connected to the first roof and the vehicle body respectively, and a second link having first and second end portions rotatably connected to the first roof and the vehicle body respectively. The first end portion and the second end portion of the first link are respectively connected to the first roof and the body at a position to the front of the first end portion and second end portion of the second link, the second roof is fixed to the second link, and the first roof, first link, the second link to which the second roof is fixed, and the vehicle body constitute a quadric crank chain.

It is advantageous that the convertible vehicle include a plate above the third roof when the vehicle is in a state such that the first and second roofs are in the use position, the third roof is in the non-use position, and the rear door is in the closed position. The purpose of the plate is to support objects transported by the vehicle.

According to the present invention, a vehicle has a first through third roofs and these roofs can be accommodated one on top of the other; therefore, even if the total length of the first through third roofs in the use position is long, these roofs can be fully accommodated in the housing unit.

DETAILED DESCRIPTION OF THE INVENTION

Figure 1:
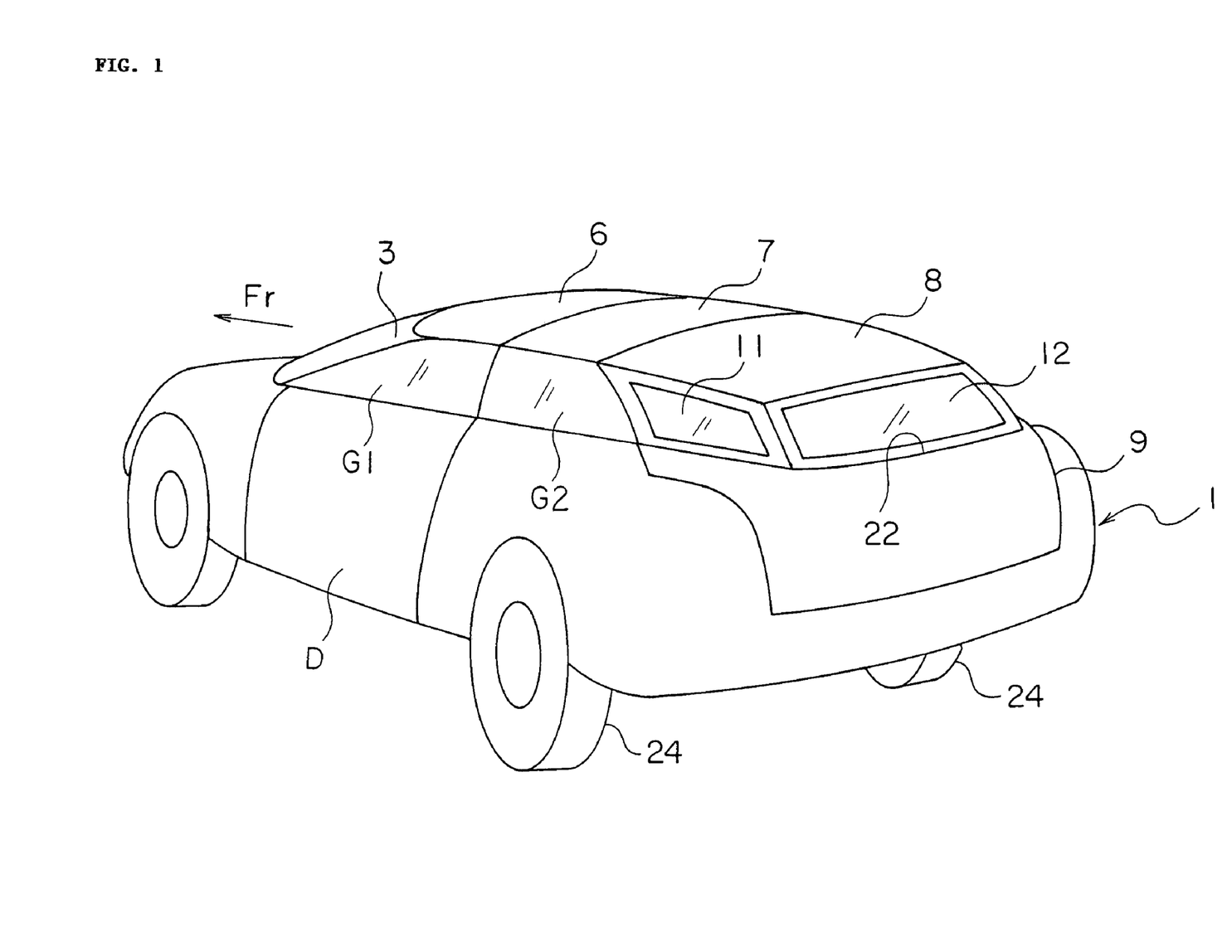
FIG. 1 is a perspective view of a convertible vehicle of the invention when the first through third roofs are in their use positions and the rear door is in the closed position.
Figure 4:
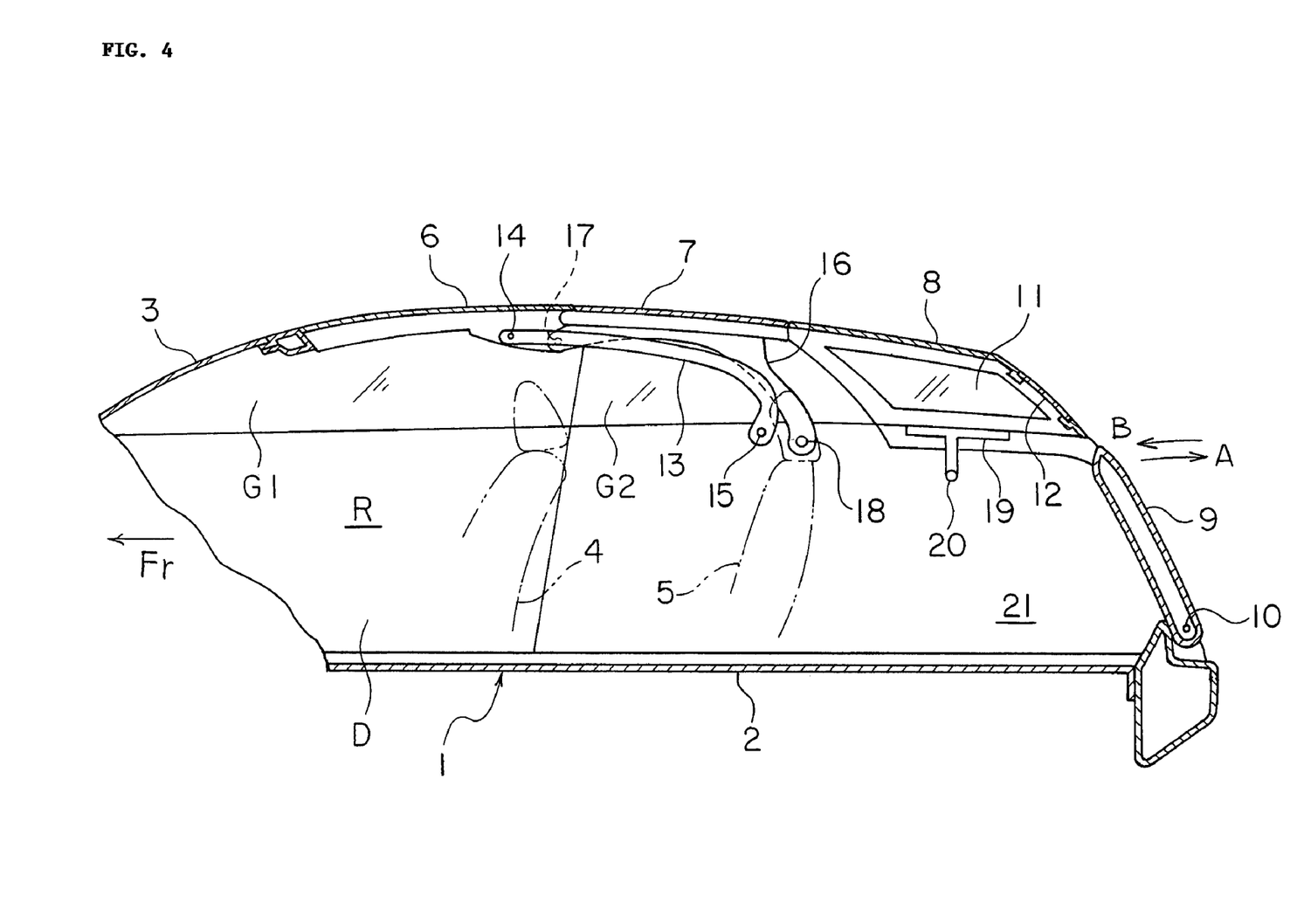
FIG. 4 is a schematic longitudinal sectional view of the convertible vehicle of FIG. 1.

FIG. 1 is a perspective view of a first embodiment of the convertible vehicle, and FIG. 4 is a schematic longitudinal sectional view of FIG. 1 showing only the sections necessary to understand the present invention. In these drawings, 1 indicates the vehicle body and R indicates the vehicle interior of the convertible vehicle. Also, 2 is a floor panel constituting a floor of the vehicle interior R. At the front section of vehicle interior R, a windshield 3 is disposed, and within the vehicle interior R, a front seat 4 and rear seat 5 (indicated with broken lines) are respectively disposed. The floor panel 2 and windshield 3 both constitute a part of the body 1. "Fr" in the drawings indicates the front direction of the convertible vehicle, and "front" and "rear" as used in the specification and claims mean front and rear with respect to the forward movement direction.

The upper part of the vehicle interior R is covered by three roofs, namely, a first roof 6, a second roof 7 and a third roof 8, and a rear door 9 is disposed in the rear section of the body 1. The rear door 9 is constituted so that the lower part thereof is rotatably connected to the body via a shaft 10 so as to allow the rear door 9 to rotate in the directions indicated by the arrows A and B and to open and close between the closed position shown in FIGS. 1 and 4 and the open position shown in FIGS. 2 and 5. The rear door 9 is supported by the body 1 so as to be able to rotatably open and close between the closed position and the open position at which the rear door 9 rotates to a position to the rear of the closed position. A shaft 10 is fixed to the rear door 9 and is supported so as to be able to rotate freely with respect to the body 1.

The first through third roofs 6, 7 and 8 and rear door 9 are made of a hard material. The hard material may be a material such as metal, hard resin and glass or a material having such a hard material as a primary component. In the example shown in the drawings, the first and second roofs 6, 7 and rear door 9 are made of a steel plate, and the third roof 8 is made from a steel plate with window panes 11 and 12 fixed thereto. The legend D indicates a side door supported by the body 1 in an openable manner. G1 and G2 indicate window panes respectively supported by the door D and the body 1 so as to be able to move up and down.

FIGS. 1 and 4 show conditions when the first through third roofs 6, 7 and 8 are in their respective use positions at which they cover the upper part of the vehicle interior R. When the first through third roofs 6, 7 and 8 are in these use positions, the first through third roofs 6, 7 and 8 are positioned so that first roof 6 covers the front section of the vehicle interior, the second roof 7 covers the middle section of the vehicle interior to the rear of the front section, and the third roof 8 covers the rear section of the vehicle interior to the rear of the middle section. When the rear door 9 is in the closed position as shown in FIGS. 1 and 4, this rear door 9 covers the rear end part of the vehicle interior below the third roof 8 in the use position.

Figure 3:
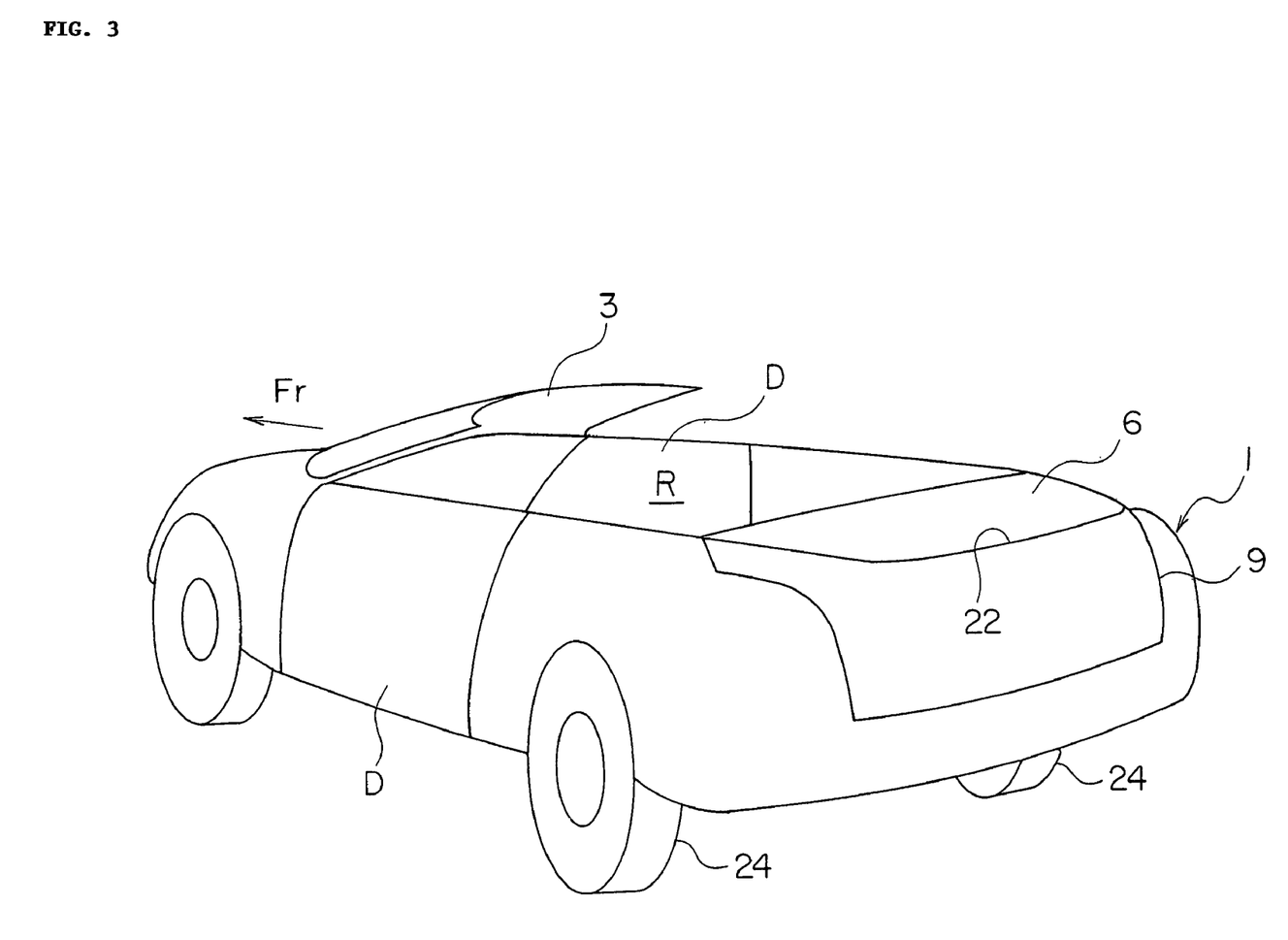
FIG. 3 is a perspective view of the aforementioned convertible vehicle when the first through third roofs are accommodated in the non-use position.
Figure 7:
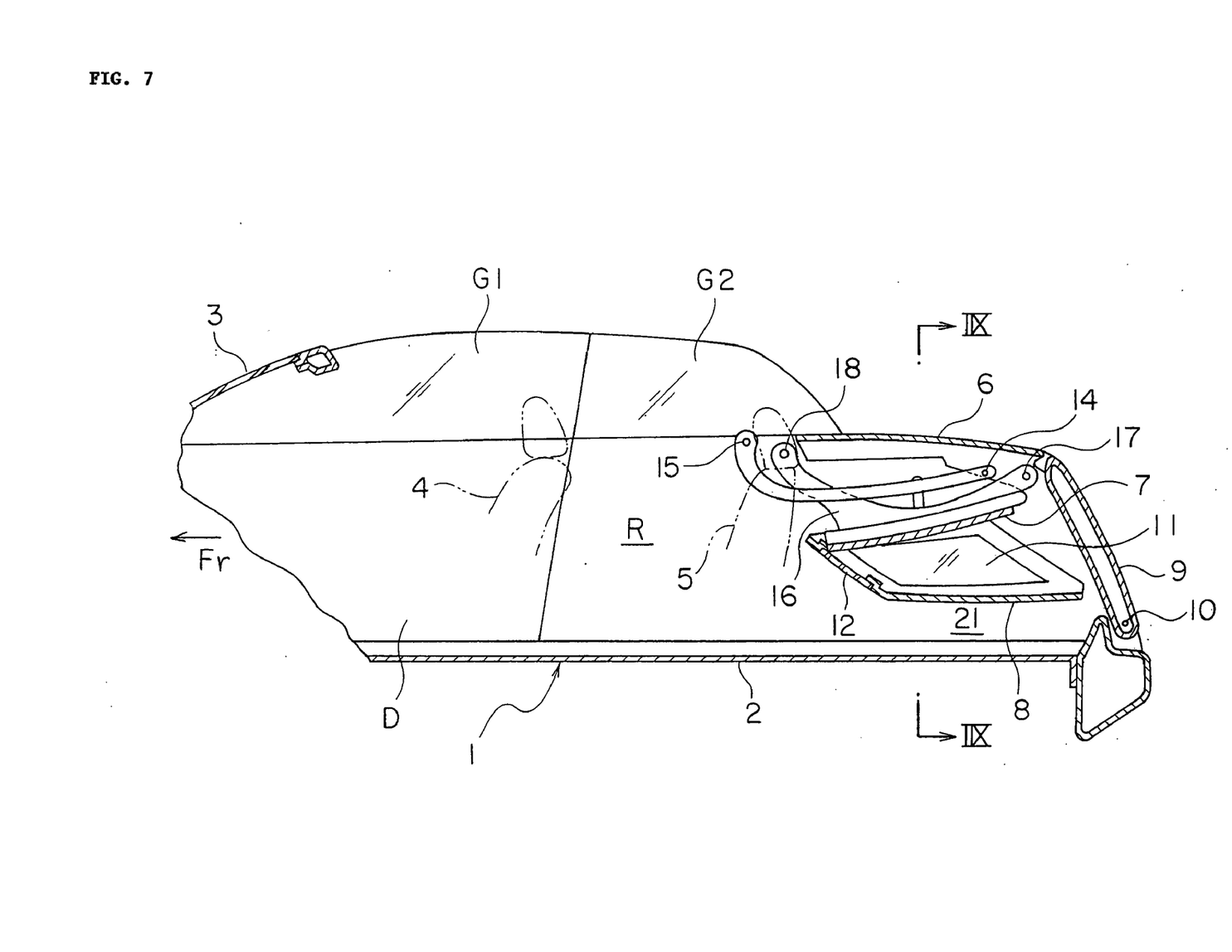
FIG. 7 is a cross-sectional view similar to FIG. 4 of the state when a rear door has been rotated from the position shown in FIG. 6 to the closed position and the accommodating operation for the first through third roofs has been completed.

The first through third roofs 6, 7 and 8 can move from the above-described use position to a non-use position at which such roofs are accommodated in a housing unit at the rear section of the body 1. FIGS. 3 and 7 show conditions when the first through third roofs 6, 7 and 8 are accommodated in a housing unit 21 in the rear section of the body 1; at such time, the upper part of the vehicle interior R is open. Thus, the first through third roofs 6, 7 and 8 are supported by the body 1 in such a manner allowing movement between the use position at which the roofs cover the upper part of the vehicle interior R and the non-use position at which the roofs are accommodated in the housing unit of the rear section of the body so as to allow the upper part of vehicle interior R to be open.

An explanation will now be given of the construction allowing the first through third roofs 6, 7 and 8 to move from the use position to the non-use position.

As shown in FIG. 4, a first end portion of a first link 13 is connected to each widthwise edge of the first roof 6 via a first coupling shaft 14 so as to allow for mutual rotation, and a second end portion of the first link 13 is rotatably connected to the body 1 via a second coupling shaft 15.

Further, a second link 16 is fixed to each widthwise edge of the second roof 7, and the first end portion of each second link 16 is connected to the first roof 6 via a third coupling shaft 17 so as to allow for mutual rotation. The second end portion of each second link 16 is rotatably connected to the body 1 via a fourth coupling shaft 18. The first coupling shaft 14 is positioned further to the front of the body 1 than the third coupling shaft 17, and the second coupling shaft 15 is positioned further to the front of the body 1 than the fourth coupling shaft 18.

Thus, a convertible vehicle according to the embodiment has the first link 13 wherein the first end portion and second end portion are rotatably connected to the first roof 6 and the body 1 respectively and the second link 16 wherein, similarly, the first end portion and second end portion are rotatably connected to the first roof 6 and the body 1 respectively. The first end portion and the second end portion of the first link 13 are connected to the first roof 6 and the body 1 respectively at positions to the front of the first end portion and the second end portion of second link 16. The second roof 7 is fixed to the second link 16. Thus, the first roof 6, first link 13, second link 16 to which the second roof 7 is fixed and body 1 constitute a quadric crank chain.

As shown in FIG. 4, a bracket 19 is fixed to the lower part of the third roof 8 and is fixedly coupled to a drive shaft 20. The drive shaft 20 is supported so as to be rotatable with respect to the body 1.

Figure 2:
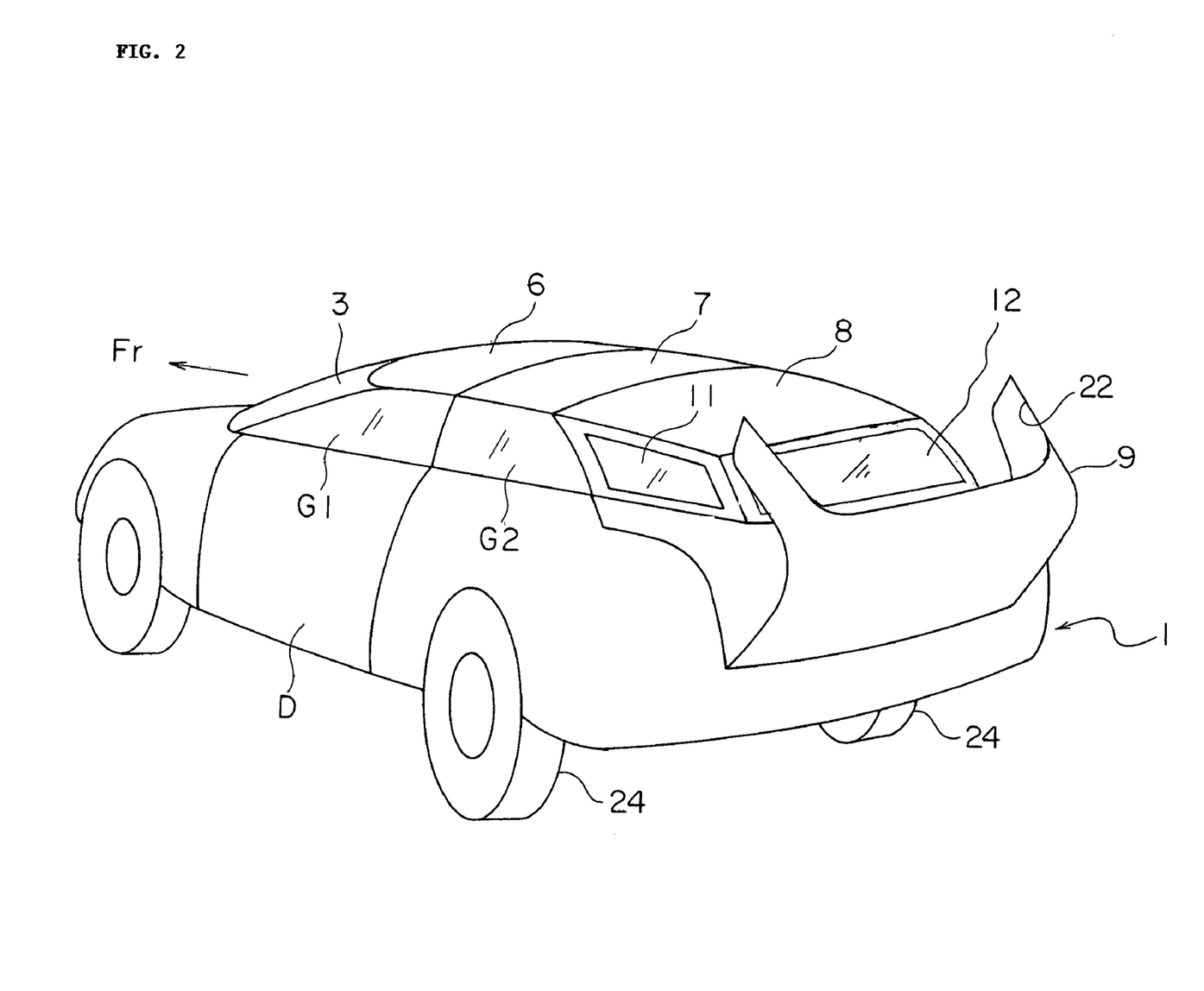
FIG. 2 is a perspective view of the aforementioned convertible vehicle when rear door has been rotated from the position shown in FIG. 1 to the open position.
Figure 5:
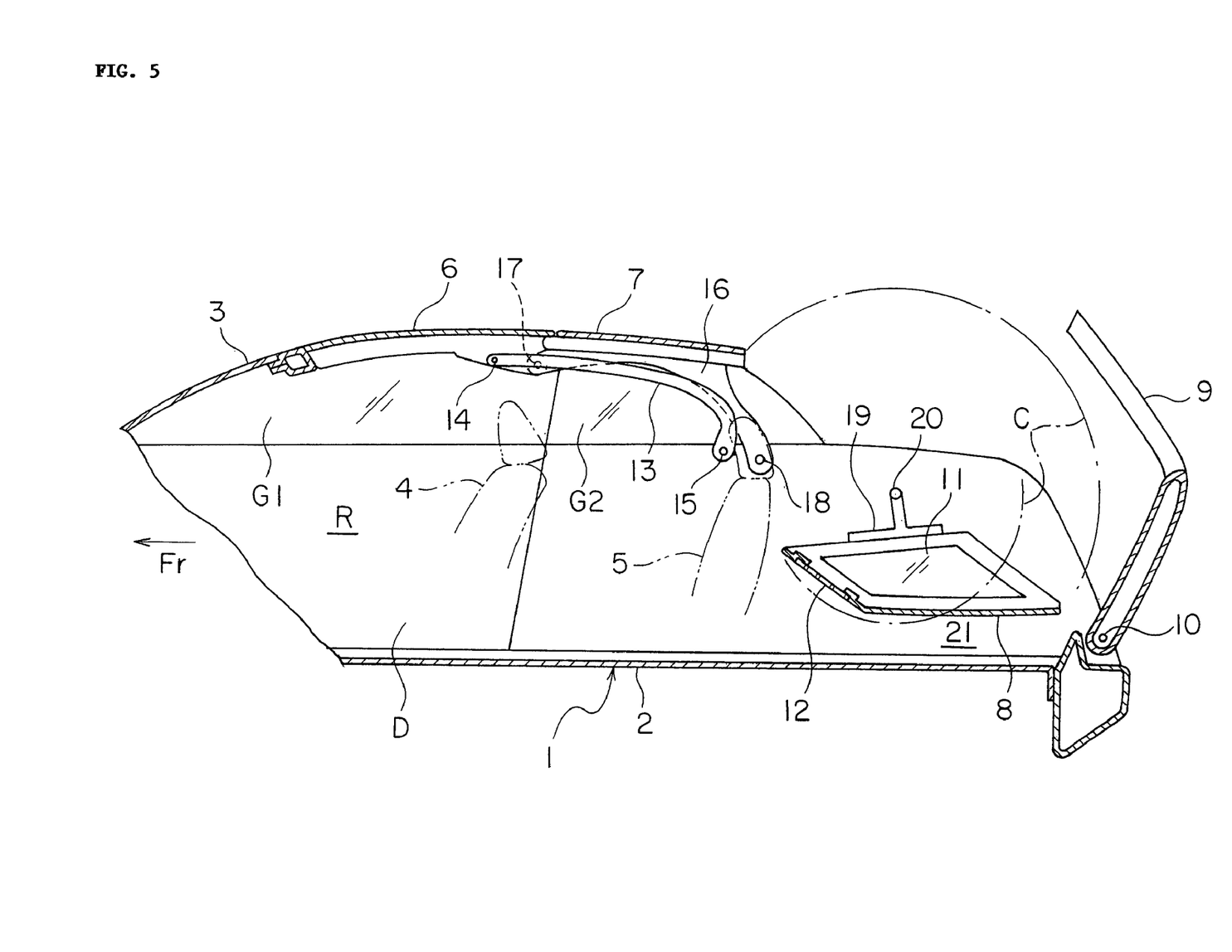
FIG. 5 is a cross-sectional view similar to FIG. 4 of the state where a rear door has been rotated to the open position and the third roof is accommodated in the non-use position.

In order to accommodate the first through third roofs 6, 7 and 8 in the housing unit 21, a first drive motor (not shown in the drawings) is operated, the shaft 10 shown in FIG. 4 is rotatively driven in the clockwise direction, and the rear door 9 fixedly coupled to the shaft 10 is rotated in the direction indicated by arrow A and is thereby brought to the open position shown in FIGS. 2 and 5.

Next, a second drive motor (not shown in the drawings) is operated, and the drive shaft 20 shown in FIG. 4 is rotatively driven in the clockwise direction. The third roof 8, describing an arc as shown by the legend C in FIG. 5, is thereby moved to the housing unit 21 and accommodated therein. The position of the third roof 8 at this time constitutes the third roof 8 non-use position.

When the third roof 8 moves from the use position shown in FIG. 4 to the non-use position shown in FIG. 5, the rear door 9, having rotated rearwards, is in the open position, so that the third roof 8 can rotate to the non-use position without being obstructed by the rear door 9. As can be seen from FIGS. 4 and 5, the third roof 8 in the non-use position is accommodated in a state that is the inverse of the state when the third roof 8 is in the use position.

Figure 6:
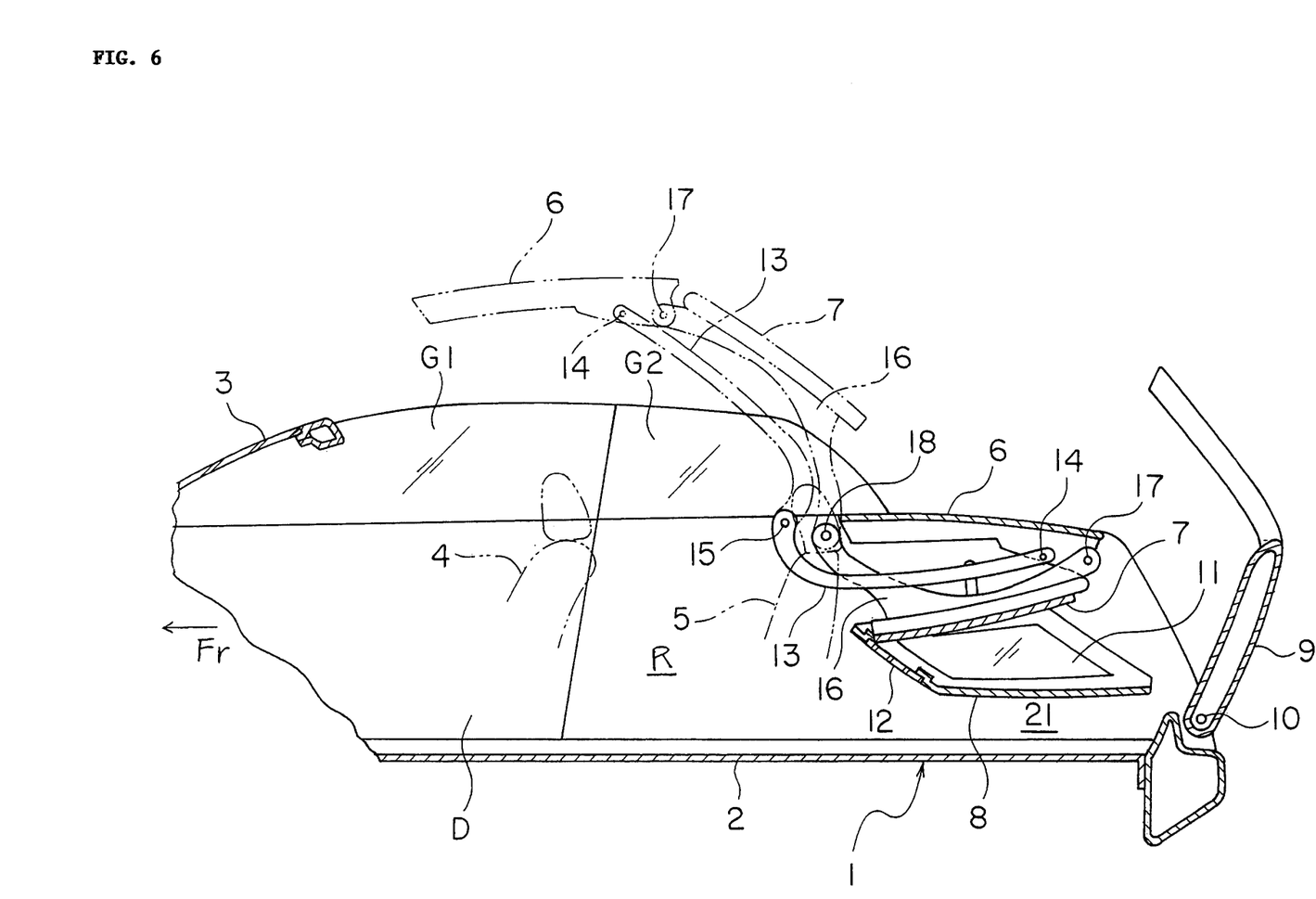
FIG. 6 is a cross-sectional view similar to FIG. 4 of the state when first and second roofs have been rotated from the position shown in FIG. 5 to the non-use position.

Next, a third drive motor (not shown in the drawings) is operated and the second coupling shaft 15 shown in FIG. 4 is rotatively driven in the clockwise direction, thereby causing the first link 13 fixed to the second coupling shaft 15 to rotate in the clockwise direction as seen in FIG. 4 around the second coupling shaft 15. At this time, because the first roof 6, first link 13, second link 16 to which the second roof 7 is fixed and body 1 constitute a quadric crank chain, when the first link 13 rotates as described above, the first and second roofs 6 and 7 and second link 16 rotate in order, as shown by the broken line of FIG. 6, and ultimately, as shown by the solid line of FIG. 6, are accommodated in the housing unit 21 on top of the third roof 8, which has already been accommodated therein. At this time, the rear door 9 is in the open position, so that the first and second roofs 6 and 7 and the first and second links 13 and 16 do not interfere with the rear door 9.

The position of the first and second roofs 6 and 7 when accommodated in the housing unit 21 as shown by solid line of FIG. 6 constitutes the non-use position for the roofs 6 and 7. While these roofs 6 and 7 are rotating from the use position shown in FIG. 4 to the non-use position shown by the solid line of FIG. 6, the first and second roofs 6 and 7 rotate relative to each, with the third coupling shaft 17 as axis, so that one is piled on top of the other. Therefore, when the first and second roofs 6 and 7 are accommodated, the first roof 6 is positioned above second roof 7. In other words, when the first through third roofs 6, 7 and 8 are in the non-use position, the first through third roofs 6, 7 and 8 are accommodated in the housing unit 21 piled up one on top of the other, so that the third roof 8 is positioned at the bottom, the second roof 7 is positioned thereupon and the first roof 6 is positioned further thereupon.

Next, as shown in FIGS. 3 and 7, the rear door 9 is rotated to the closed position, thus completing the accommodation operations for the first through third roofs 6, 7 and 8. At this time, as shown in FIGS. 3 and 7, the upper part of the vehicle interior R is open. By performing this operation in reverse, the first through third roofs 6, 7, and 8 can be brought to the use position shown in FIG. 4. FIG. 3 shows a state where the window panes G1 and G2 shown in FIG. 7 are lowered.

As described above, the rear door 9 is constituted so that the lower part of the rear door 9 is rotatably connected to the body 1 so that, when the first through third roofs 6, 7, and 8 move between the use position and the non-use position, the rear door 9 is at the open position at which it does not obstruct the movement of the first through third roofs 6, 7 and 8, thereby allowing the first through third roofs 6, 7 and 8 to move between the use position and the non-use position without obstruction.

Thus, as set forth above, because the convertible vehicle according to this embodiment comprises a roof divided into first through third roofs 6, 7 and 8, and because these roofs 6, 7, and 8 are accommodated piled one on top of the other in the vertical direction, even though the full length of the roofs 6, 7, and 8 is long when they are in the use position, as shown in FIG. 1, these roofs 6, 7 and 8 can be easily accommodated.

As shown in FIGS. 1 through 3, the rear door 9 of the convertible vehicle according to this embodiment has a cutaway part 22 formed on its upper part in the middle section of the widthwise direction of the body 1. For this reason, as shown in FIGS. 1 and 4, when the first through third roofs 6, 7 and 8 are in the use position and the rear door 9 is in the closed position, the third roof 8 is positioned at the cutaway part 22 of the rear door 9, allowing the third roof 8 to move to its use position without any problems.

As shown in FIGS. 3 and 7, when the first through third roofs 6, 7 and 8 are in their non-use positions and the rear door 9 is in the closed position, the first roof 6 is positioned at the cutaway part 22 of the rear door 9, the second and third roofs 7 and 8 are covered and hidden by the first roof 6 and the upper surface of the first roof 6 is exposed to the outside. Therefore, the cutaway part 22 formed on the rear door 9 will not be left open. By making the upper surface of the first roof 6 a different color from that of the rear door 9, or by using different materials, the appearance of the first roof 6 when accommodated at the non-use position as shown in FIG. 3 can be improved.

Figure 8:
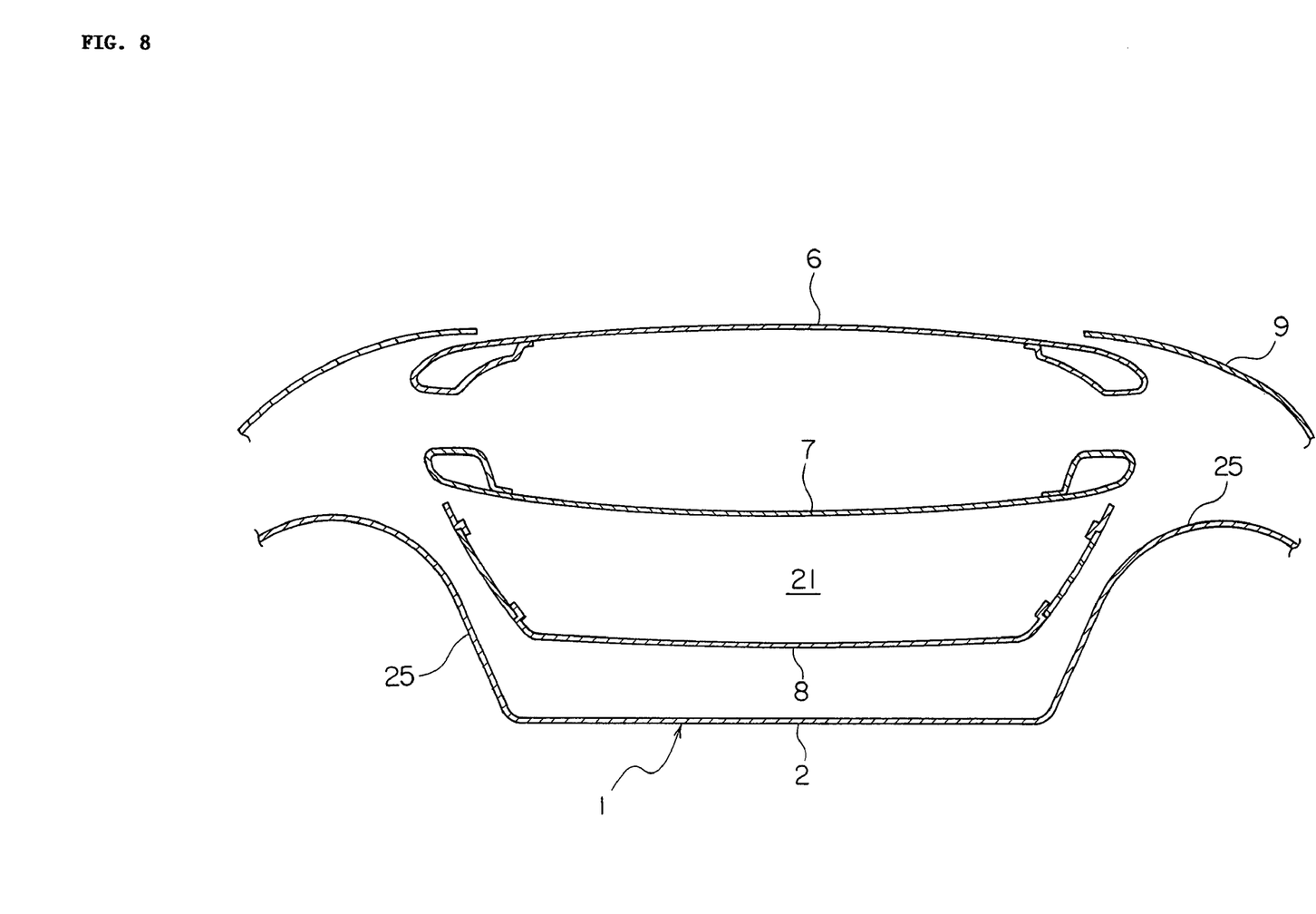
FIG. 8 is a schematic sectional view along the line IIX—IIX of FIG. 7.

FIG. 8 is a schematic cross-sectional view along the IIX—IIX line of FIG. 7 when the first through third roofs 6, 7, and 8 are accommodated at the non-use position. As can be seen from this drawing, on both sides of the housing unit 21 in the body widthwise direction a wheel well 25 is disposed, such wheel housing being a part of the vehicle body that demarcates a space for accommodating a rear wheel 24 shown in FIGS. 1 through 3. The width between these wheel wells 25 is narrower than the width of the upper portion of the housing unit 21. However, in the convertible vehicle of this embodiment, the third roof 8 when in the non-use position is accommodated in a state that is the inverse of the state when the third roof 8 is in the use position; as shown in FIG. 8, the third roof 8 when accommodated in the housing unit 21 protrudes and the body widthwise width of the lower portion thereof is narrower than that of the upper portion. Due to this, the third roof 8 can be accommodated in the relatively narrower space between the pair of wheel wells 25, as shown in FIG. 8. The third roof 8 can be accommodated in the lower region of the housing unit 21. Therefore, the space of the housing unit 21 is effectively utilized, and the first through third roofs 6, 7 and 8 are accommodated in the housing unit 21 without any problems.

Figure 9:
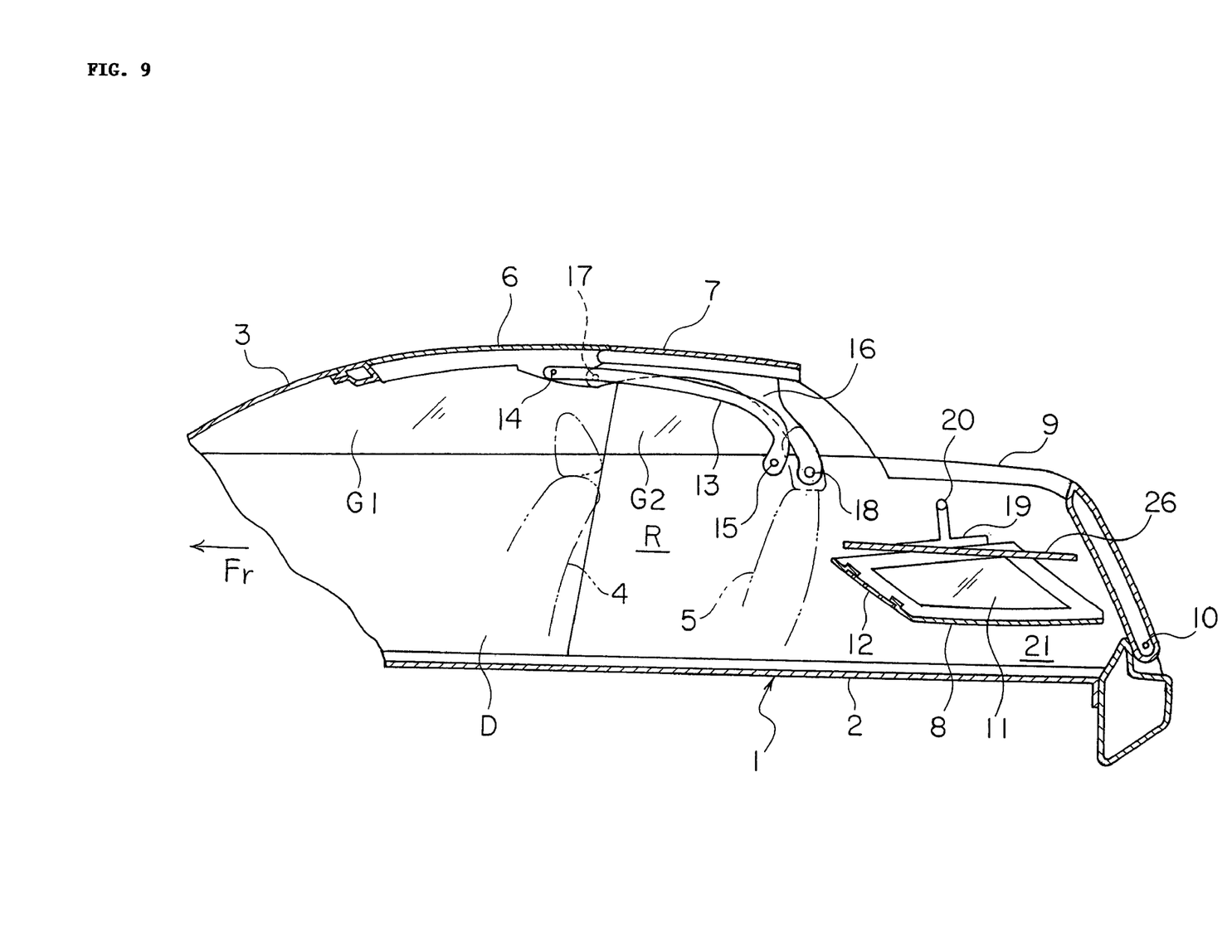
FIG. 9 is a schematic longitudinal sectional view of a convertible vehicle when a plate for placing objects has been set.

Further, as shown in FIG. 9, when the first and second roofs 6, 7 are in their use positions, with only the third roof 8 in the non-use position accommodated in housing unit 21, and the rear door 9 is in the closed position, the space above the housing unit 21 will be open. Therefore, by providing a plate 26 for supporting objects removably disposed above the third roof 8, tall objects can be placed on the plate 26 for transport by the vehicle. In this way, the convertible vehicle can be used in the same manner as a pickup truck.

Figure 10:
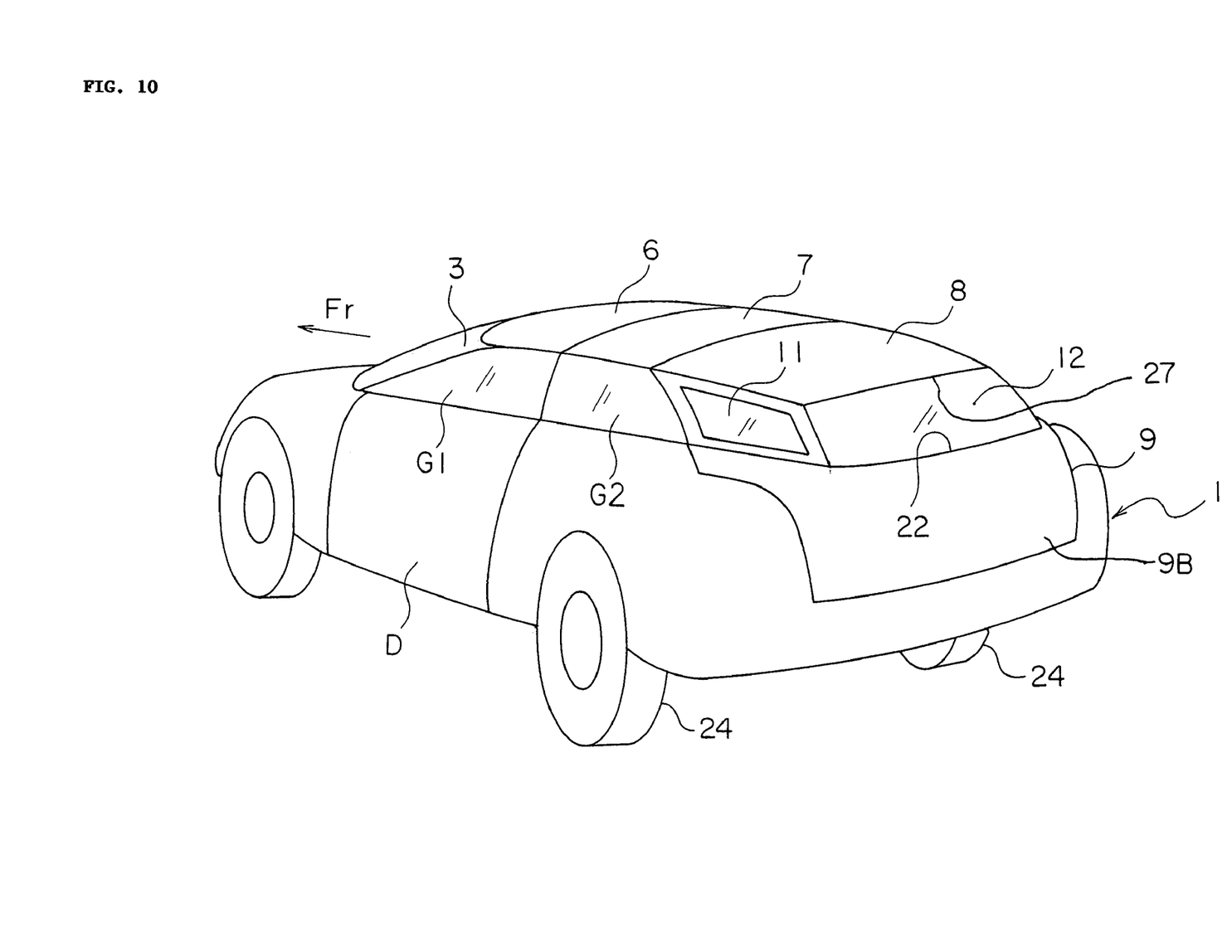
FIG. 10 is an oblique view similar to FIG. 1 showing another embodiment of a convertible vehicle.
Figure 11:
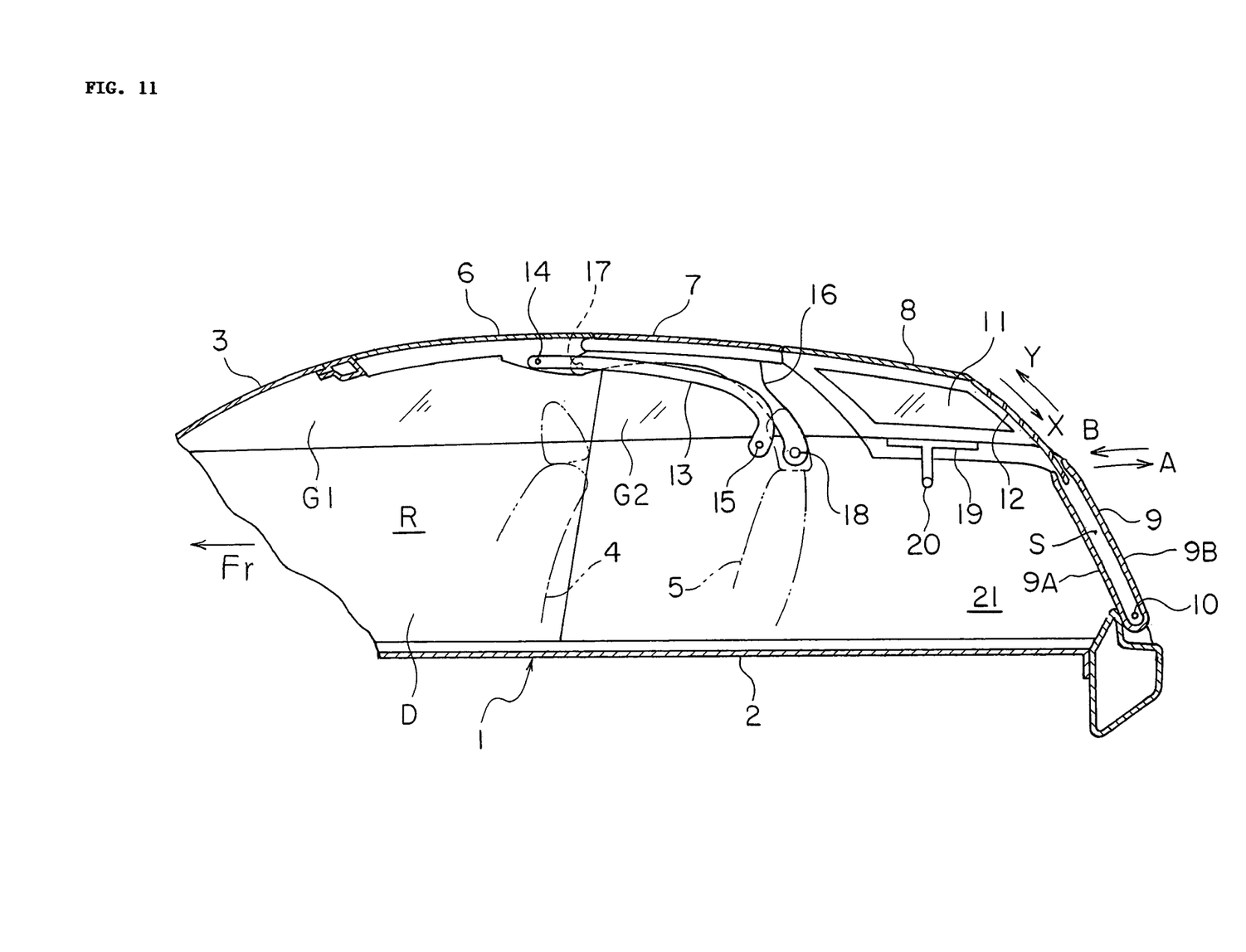
FIG. 11 is a schematic sectional view of the convertible vehicle of FIG. 10.
Figure 12:
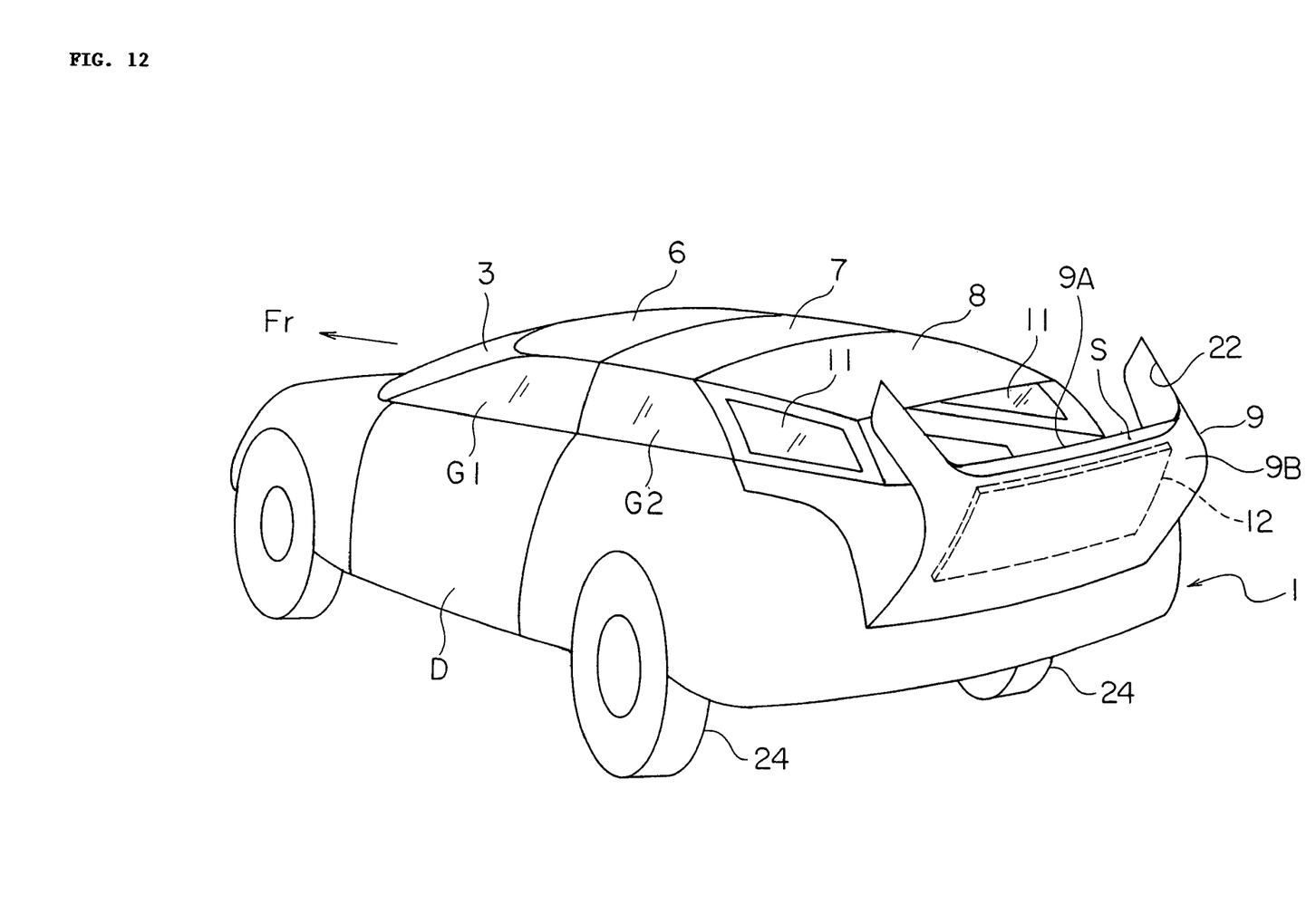
FIG. 12 is a perspective view of the convertible vehicle shown in FIG. 10 when the rear door has been rotated to the open position.

In the embodiment described above, the third roof 8 comprises a window pane 12 fixed on the rear section thereof. This window pane can also be supported on the rear door 9 so as to be able to move up and down. FIGS. 10 through 12 show one example thereof.

FIGS. 10 and 11, just as with FIGS. 1 and 4, show a state in which the first through third roofs 6, 7, and 8 are in the use position and the rear door 9 has been moved to the closed position. This rear door 9 comprises an inner panel 9A on the vehicle interior and an outer panel 9B on the vehicle exterior, these panels 9A and 9B being integrally fixed, forming a space S therebetween, and having an open upper part.

The rear section of the third roof 8 is open and a window pane 12 is disposed at this opening 27. This window pane 12 is supported by the rear door 9 in such a manner as to be able to go up or down, in the same way as windows disposed on a side or rear door of a standard vehicle, by a window regulator (not shown in the drawings) in the directions indicated by arrows X and Y in FIG. 11. When the opening 27 of the third roof 8 is opened, the window pane 12 is lowered in the direction indicated by the arrow X, and this window pane 12 is accommodated in the space S between the inner panel 9A and outer panel 9B of the rear door 9. Conversely, by raising the window pane 12 in the direction shown by the arrow Y, the opening 27 of the rear section of the third roof 8 is closed by the window pane 12, as shown in FIGS. 10 and 11. Thus, in the convertible vehicle of this embodiment, the window pane 12 that opens and closes the opening 27 of the rear section of the third roof 8 is a constituent element not of the third roof 8 but rather of the rear door 9.

The window pane 12 shown in FIGS. 10 and 11 can be constituted so as to automatically move up and down by means of an electric window regulator, and so that when the rear door 9 rotates to the open position, prior to this rotational movement, the window pane 12 is automatically accommodated in the space S of the rear door 9. In such a case, as shown in FIG. 12, when the rear door 9 is opened and closed and when the back door is in the open position, the window pane 12 is without fail accommodated in the space S inside the rear door 9.

The other parts of the convertible vehicle shown in FIGS. 10 through 12 can be constituted in the same way as in the convertible vehicle shown in FIGS. 1 through 9. The parts in FIGS. 10 through 12 corresponding to parts of the convertible vehicle shown in FIGS. 1 through 8 have been denoted with the same legends as used for FIGS. 1 through 8.

JP 2003-387049, based upon which Convention priority is claimed, is hereby incorporated herein by reference.

What is claimed is:

1. A convertible vehicle comprising:
a vehicle body having a front end and a rear end and a housing unit in a rear section of the vehicle body;
a first through third roofs made of a hard material and supported by the vehicle body so as to be movable between a use position at which the upper part of the vehicle interior is covered and a non-use position at which the roofs are accommodated in the housing unit in the rear section of the vehicle body so as to allow the upper portion of the vehicle interior to be open;
a rear door made of a hard material supported by the vehicle body so as to rotatably open and close between a closed position and an open position at which the rear door is rotated to the rear of such closed position,
the first through third roofs in the use position being respectively positioned so that the first roof covers a vehicle interior front section, the second roof covers a vehicle interior middle section, the vehicle interior middle section being to the rear of the vehicle interior front section and the third roof covers a vehicle interior rear section, the vehicle interior rear section being to the rear of the vehicle interior middle section;
the first through third roofs in the non-use position being accommodated in the housing unit one on top of the other in a vertical direction, so that the third roof is positioned at a bottom position, the second roof is positioned thereupon, and the first roof is positioned upon the second roof;
the rear door being constituted so that, when the rear door is in the closed position, the rear door covers the vehicle interior rear section which is below the third roof when the roof is in the use position, and a lower part of the rear door is rotatably connected to the vehicle body so that when the first through third roofs move between the use position and the non-use position, the rear door is at an open position at which it does not obstruct the movement of the first through third roofs;
the rear door having an upper portion having a cutaway aligned with a middle of the vehicle body in widthwise direction, so that when the first through third roofs are in the use position and the rear door is in the closed position, the third roof is positioned at the cutaway part of the rear door, and when the first through third roofs are in the non-use position and the rear door is in the closed position, the first roof is positioned at the cutaway part of the rear door, the second and third roofs are covered by the first roof, and the upper surface of the first roof is exposed to the outside.

2. The convertible vehicle according to claim 1, wherein the third roof when in the non-use position is accommodated in an orientation inverted from an orientation of the third roof in the use position orientation and in a space between a pair of wheel wells.

3. The convertible vehicle according to claim 2, further comprising:
a first link having a first link first end portion and a first link second end portion rotatably connected to the first roof and the vehicle body respectively; and
a second link having a second link first end portion and a second link second end portion rotatably connected to the first roof and the vehicle body respectively, wherein the first link first end portion and the first link second end portion of the first link are respectively connected to the first roof and the vehicle body at a position more to the front end than the second link first end portion and the second link second end portion of the second link, the second roof is fixed to the second link, and the first roof, the first link, the second link to which tie second roof is fixed, and the vehicle body constitute a quadric crank chain.

4. A convertible vehicle, comprising:
a vehicle body having a front end ends rear end and a housing unit in a rear section of the vehicle body;
a first through third roofs made of a hard material and supported by the vehicle body so as to be movable between a use position at which the upper part of the vehicle interior is covered and a non-use position at which the roofs are accommodated in the housing unit in the rear section of the vehicle body so as to allow the upper portion of the vehicle interior to be open;
a rear door made of a hard material supported by the vehicle body so as to rotatably open and close between a closed position and an open position at which the rear door is rotated to the rear of such closed position,
the first through third roofs in the use position being respectively positioned so that the first roof covers a vehicle interior front section, the second roof covers a vehicle interior middle section, the vehicle interior middle section being to the rear of the vehicle interior front section, and the third roof covers a vehicle interior rear section, the vehicle interior rear section being to the rear of the vehicle interior middle section;
the first through third roofs in the non-use position being accommodated in the housing unit one on top of the other in a vertical direction, so that the third roof is positioned at a bottom position, the second roof is positioned thereupon, and the first roof is positioned upon the second roof;
the rear door being constituted so that when the rear door is in the closed position, the rear door covers the vehicle interior rear section which is below the third roof when the roof is in the use position, and a lower part of the rear door is rotatably connected to the vehicle body so that, when the first through third roofs move between the use position and the non-use position, the rear door is at an open position at which it does not obstruct the movement of the first through third roofs; and a plate above the third roof for supporting objects to be transported when the vehicle is in a state such that the first and second roofs are in the use position, the third roof is in the non-use position, and the rear door is in the closed position.

5. The convertible vehicle according to claim 4, wherein the third roof when in the non-use position is accommodated in an orientation inverted from an orientation of the third roof in the use position orientation and in a space between a pair of wheel wells.

6. The convertible vehicle according to claim 5, further comprising:

a first link having a first link first end portion and a first link second end portion rotatably connected to the first roof and the vehicle body respectively; and a second link having a second link first end portion and a second link second end portion rotatably connected to the first roof and the vehicle body respectively, wherein the first link first end portion and the first link second end portion of the first link are respectively connected to the first roof and the vehicle body at a position more to the front end than the second link first end portion and the second link second end portion of the second link, the second roof is fixed to the second link, and the first roof the first link, the second link to which the second roof is fixed, and the vehicle body constitute a quadric crank chain.

7. The convertible vehicle according to claim 4, further comprising:

a first link having a first link first end portion and a first link second end portion rotatably connected to the first roof and the vehicle body respectively; and a second link having a second link first end portion and a second link second end portion rotatably connected to the first roof and the vehicle body respectively, wherein the first link first end portion and the first link second end port on of the first link are respectively connected to the first roof and the vehicle body at a position more to the front end than the second link first end portion and the second link second end portion of the second link, the second roof is fixed to the second link, and the first roof the first link, the second link to which the second roof is fixed, and the vehicle body constitute a quadric crank chain.

8. The convertible vehicle according to claim 1, further comprising:

a first link having a first link first end portion and a first link second end portion rotatably connected to the first roof and the vehicle body respectively; and a second link having a second link first end portion and a second link second end portion rotatably connected to the first roof and the vehicle body respectively, wherein the first link first end portion and the first link second end portion of the first link are respectively connected to the first roof and the vehicle body at a position more to the front end than the second link first end portion and the second link second end portion of the second link, the second roof is fixed to the second link, and the first roof, the first link, the second link to which the second roof is fixed, and the vehicle body constitute a quadric crank chain.

\* \* \* \* \*